(12) United States Patent
Zhang et al.

(10) Patent No.: US 12,119,662 B1
(45) Date of Patent: Oct. 15, 2024

(54) OPTICAL STORAGE DIRECT CURRENT COUPLING CONTROL CIRCUIT AND RELATED APPARATUS

(71) Applicant: CONTEMPORARY AMPEREX TECHNOLOGY CO., LIMITED, Ningde (CN)

(72) Inventors: Miaomiao Zhang, Ningde (CN); Weilong Feng, Ningde (CN); Shuyun Xiong, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/737,425

(22) Filed: Jun. 7, 2024

Related U.S. Application Data

(63) Continuation of application No. PCT/CN2022/078587, filed on Mar. 1, 2022.

(51) Int. Cl.
*H02J 3/46* (2006.01)

(52) U.S. Cl.
CPC ............. *H02J 3/46* (2013.01); *H02J 2300/24* (2020.01)

(58) Field of Classification Search
CPC ................................ H02J 3/46; H02J 2300/24
USPC .......................................................... 307/24
See application file for complete search history.

(56) References Cited

U.S. PATENT DOCUMENTS 10,882,412 B2 * 1/2021 Mrlik ................. H02J 7/35

FOREIGN PATENT DOCUMENTS

| CN | 103441531 A | 12/2013 |
|---|---|---|
| CN | 104022527 A | 9/2014 |
| CN | 108695870 A | 10/2018 |
| CN | 109149651 A | 1/2019 |
| CN | 109599898 A | 4/2019 |
| CN | 111293717 A | 6/2020 |
| CN | 112751357 A | 5/2021 |

(Continued)

OTHER PUBLICATIONS

The World Intellectual Property Organization (WIPO) International Search Report and Written Opinion for PCT/CN2022/078587 Nov. 8, 2022 12 Pages (including translation).

(Continued)

*Primary Examiner* — Michael R. Fin
(74) *Attorney, Agent, or Firm* — ANOVA LAW GROUP, PLLC

(57) ABSTRACT

A circuit includes: a DC-AC module, a DC-DC module, and a control module. The control module is configured to calculate, according to an actual output power of a plurality of photovoltaic systems and an output power demand value of the DC-AC module, AC voltages and DC voltages under a plurality of different bus voltage setting values; determine, according to the different bus voltage setting values and the AC voltages and the DC voltages under the different bus voltage setting values, a target bus voltage value, a target AC voltage value, and a target DC voltage value when the energy storage module reaches maximum charging power; and control the plurality of photovoltaic systems, the DC-AC module, and the DC-DC module to perform output correspondingly according to the target bus voltage value, the target AC voltage value, and the target DC voltage value.

18 Claims, 6 Drawing Sheets

(56) References Cited

FOREIGN PATENT DOCUMENTS

EP    3570423  A1    11/2019

OTHER PUBLICATIONS

Jun Liu, Status and Trend Analysis on Grid Integration Key Technologies of Renewable Energy Power Generation, Journal, p. 47-52, State Grid Energy Research Institute, Beijing 100052, China.

* cited by examiner

OPTICAL STORAGE DIRECT CURRENT COUPLING CONTROL CIRCUIT AND RELATED APPARATUS

CROSS REFERENCE TO RELATED APPLICATION

The present application is a continuation of International Patent Application No. PCT/CN2022/078587 filed on Mar. 1, 2022, the entire content of which is incorporated herein by reference.

TECHNICAL FIELD

The present application relates to the technical field of energy storage devices, and in particular, to an optical storage direct current (DC) coupling control circuit and method, an optical storage DC coupling control system, a readable storage medium, and a computer program product.

BACKGROUND

With the development of new energy technologies, various power generation technologies have developed rapidly in recent years. Photovoltaic power generation has attracted widespread attention due to its advantages such as low pollution. In order to stabilize output of the photovoltaic power generation, an optical storage system has emerged. The optical storage system includes a photovoltaic system and an energy storage module. The energy storage module may be controlled for charging when the photovoltaic system generates excessively much power, and the energy storage module may be controlled for discharging when the photovoltaic system generates excessively little power, so that the output of the photovoltaic power generation can be stably outputted to a power grid, thereby ensuring stable operation of the power grid.

An optical storage DC coupling system is one of the optical storage systems. In the related art, when the optical storage DC coupling system generates excessively much power and charges the energy storage module, a Maximum Power Point Tracking (MPPT) unit performs scheduling control according to its own optimal efficiency conversion point, so that the photovoltaic system supplies power to the energy storage module. However, this scheduling control scheme is considered for a single MPPT, so it is difficult to meet an energy storage demand for the energy storage module.

SUMMARY

Embodiments of the present application provide an optical storage DC coupling control circuit and method, an optical storage DC coupling control system, a readable storage medium, and a computer program product to solve the problem that the scheduling control scheme in the related art is difficult to meet an energy storage demand of the energy storage module.

In an aspect, the present application provides an optical storage DC coupling control circuit, including:
- a Direct Current-Alternating Current (DC-AC) module, a DC side of the DC-AC module being connected to a plurality of photovoltaic systems via a DC bus, and an AC side of the DC-AC module being connected to a power grid;
- a Direct Current-Direct Current (DC-DC) module, a first terminal of the DC-DC module being configured to connect the DC bus, and a second terminal of the DC-DC module being connected to an energy storage module; and
- a control module respectively connected to the DC-AC module, the DC-DC module, and the plurality of photovoltaic systems and configured to acquire an actual output power of the photovoltaic systems and an output power demand value of the DC-AC module, and respectively calculate, according to the actual output power and the output power demand value, AC voltages and DC voltages when output power of the DC-AC module reaches the output power demand value under a plurality of different bus voltage setting values, the AC voltages being AC-side output voltages when the DC-AC module reaches maximum conversion efficiencies, and the DC voltages being charging voltages of the energy storage module when the DC-DC module reaches maximum conversion efficiencies;
- the control module being further configured to determine, according to the different bus voltage setting values and the AC voltages and the DC voltages under the different bus voltage setting values, a target bus voltage value, a target AC voltage value, and a target DC voltage value when the energy storage module reaches maximum charging power, and control the plurality of photovoltaic systems, the DC-AC module, and the DC-DC module to perform output correspondingly according to the target bus voltage value, the target AC voltage value, and the target DC voltage value.

According to the optical storage DC coupling control circuit provided in the embodiments of the present application, the control module respectively calculates AC voltages and DC voltages when output power of the DC-AC module reaches the output power demand value under a plurality of different bus voltage setting values, the AC voltages being AC-side output voltages when the DC-AC module reaches maximum conversion efficiencies, and the DC voltages being charging voltages of an energy storage module when the DC-DC module reaches maximum conversion efficiencies, then determines, according to the different bus voltage setting values and the AC voltages and the DC voltages under the different bus voltage setting values, a target bus voltage value, a target AC voltage value, and a target DC voltage value when the energy storage module reaches maximum charging power, and controls the plurality of photovoltaic systems, the DC-AC module, and the DC-DC module to perform output correspondingly according to the target bus voltage value, the target AC voltage value, and the target DC voltage value. Therefore, in consideration of three aspects: the DC-DC module, the photovoltaic system, and the DC-AC module, the photovoltaic system can supply power to an energy storage device as much as possible while meeting a basic energy demand of the power grid, so as to solve the problem that the scheduling control scheme in the related art is difficult to meet an energy storage demand of the energy storage module.

Optionally, the control module is further configured to calculate, according to the output power demand value, the actual output power, the different bus voltage setting values, and the AC voltages and the DC voltages under the different bus voltage setting values, charging powers of the energy storage module under the different bus voltage setting values, to obtain a plurality of candidate charging powers.

The control module is further configured to select maximum candidate charging power from the plurality of candidate charging powers, and acquire a bus voltage setting value, an AC voltage, and a DC voltage when the maximum candidate charging power is reached, the bus voltage setting value, the AC voltage, and the DC voltage when the maximum candidate charging power is reached corresponding to the target bus voltage value, the target AC voltage value, and the target DC voltage value.

In the above solution, the plurality of candidate charging powers are obtained by traversal calculation, and the maximum charging power is selected therefrom. The operations are simple and convenient, and a selection scheme of an optimal solution with finite parameters is given, which helps to realize the control over an optimal scheduling scheme of the optical storage DC coupling system, and can meet the energy storage demand of the energy storage module to the greatest extent.

Optionally, the control module is further configured to calculate, according to the output power demand value, the actual output power, the different bus voltage setting values, and the AC voltages and the DC voltages under the different bus voltage setting values, charging powers of the energy storage module under the different bus voltage setting values.

The control module is further configured to process the different bus voltage setting values, and the AC voltages, the DC voltages, and the charging powers under the different bus voltage setting values to obtain a fitting relationship between the bus voltage setting values, the AC voltages, the DC voltages, and the charging powers, so as to calculate, according to the fitting relationship, the target bus voltage value, the target AC voltage value, and the target DC voltage value at the maximum charging power.

In the above solution, a relationship between various parameters is fitted, so that the maximum charging power of the energy storage module with reasonable conversion efficiency of each device module of the optical-storage DC coupling system, and output voltage parameters of the DC-DC module, the DC-AC module, and the plurality of photovoltaic systems when the maximum charging power is reached can be obtained according to the fitting relationship. Thus the energy storage demand of the energy storage module can be met to the greatest extent.

Optionally, the control module is further configured to acquire, according to the output power demand value and the plurality of different bus voltage setting values, maximum conversion efficiencies respectively corresponding to the DC-AC module when the output power of the DC-AC module reaches the output power demand value under the different bus voltage setting values; and the control module is further configured to calculate the AC voltages under the different bus voltage setting values, the AC voltages being AC-side voltages when the DC-AC module reaches the maximum conversion efficiencies.

In the above solution, a specific manner of obtaining the maximum conversion efficiencies of the DC-AC module and the corresponding AC-side output voltages under the different bus voltage setting values is given, which resolves an optimal solution to the output voltages of the DC-AC module under the different bus voltage setting values and provides data reference for subsequent system-based scheduling control.

Optionally, the control module is further configured to acquire maximum conversion efficiencies of the photovoltaic systems under the different bus voltage setting values according to the actual output power of the photovoltaic systems and the plurality of different bus voltage setting values;

the control module is further configured to calculate remaining powers of the DC bus under the different bus voltage setting values according to the actual output power of the photovoltaic systems, the maximum conversion efficiencies of the photovoltaic systems, the maximum conversion efficiencies respectively corresponding to the DC-AC module, and the AC voltages under the different bus voltage setting values;

the control module is further configured to acquire maximum conversion efficiencies of the DC-DC module under the different bus voltage setting values according to the different bus voltage setting values and the remaining powers of the DC bus under the different bus voltage setting values; and the control module is further configured to calculate the DC voltages under the different bus voltage setting values, the DC voltages being the charging voltages of the energy storage module when the DC-DC module reaches the maximum conversion efficiencies.

In the above solution, a specific manner of obtaining the charging voltages of the energy storage module under the different bus voltage setting values when the DC-DC module reaches the maximum conversion efficiencies is given, which resolves an optimal solution to the output voltages of the DC-DC module under the different bus voltage setting values and provides data reference for subsequent system-based scheduling control.

Optionally, the optical storage DC coupling control circuit further includes a collection module;

the collection module is connected to the control module and configured to collect and send current values and voltage values of the photovoltaic systems; and the control module is further configured to calculate the actual output power of the photovoltaic systems according to the current values and the voltage values of the photovoltaic systems.

In the above solution, the actual output power of the photovoltaic systems is calculated through the arrangement of the collection module and according to the collected current values and voltage values of the photovoltaic systems, which provides data reference for subsequent system-based scheduling control.

In another aspect, the present application further provides an optical storage DC coupling control method, applied to an optical storage DC coupling control system, the optical storage DC coupling control system being connected to a DC-AC module, a DC-DC module, and a plurality of photovoltaic systems respectively; the method including:

acquiring actual output power of the photovoltaic systems and an output power demand value of the DC-AC module;

respectively calculating, according to the actual output power and the output power demand value, AC voltages and DC voltages when output power of the DC-AC module reaches the output power demand value under a plurality of different bus voltage setting values, the AC voltages being AC-side output voltages when the DC-AC module reaches maximum conversion efficiencies, and the DC voltages being charging voltages of an energy storage module connected to the DC-DC module when the DC-DC module reaches maximum conversion efficiencies;

determining, according to the different bus voltage setting values and the AC voltages and the DC voltages under the different bus voltage setting values, a target bus voltage value, a target AC voltage value, and a target DC voltage value when the energy storage module reaches maximum charging power; and controlling the plurality of photovoltaic systems, the DC-AC module, and the DC-DC module to perform output correspondingly according to the target bus voltage value, the target AC voltage value, and the target DC voltage value.

Optionally, the determining, according to the different bus voltage setting values and the AC voltages and the DC voltages under the different bus voltage setting values, a target bus voltage value, a target AC voltage value, and a target DC voltage value when the energy storage module reaches maximum charging power may include:
  calculating, according to the output power demand value, the actual output power, the different bus voltage setting values, and the AC voltages and the DC voltages under the different bus voltage setting values, charging powers of the energy storage module under the different bus voltage setting values, to obtain a plurality of candidate charging powers;
  selecting maximum candidate charging power from the plurality of candidate charging powers; and
  acquiring a bus voltage setting value, an AC voltage, and a DC voltage when the maximum candidate charging power is reached, the bus voltage setting value, the AC voltage, and the DC voltage when the maximum candidate charging power is reached corresponding to the target bus voltage value, the target AC voltage value, and the target DC voltage value.

Optionally, the determining, according to the different bus voltage setting values and the AC voltages and the DC voltages under the different bus voltage setting values, a target bus voltage value, a target AC voltage value, and a target DC voltage value when the energy storage module reaches maximum charging power may include:
  calculating, according to the output power demand value, the actual output power, the different bus voltage setting values, and the AC voltages and the DC voltages under the different bus voltage setting values, charging powers of the energy storage module under the different bus voltage setting values;
  processing the different bus voltage setting values, and the AC voltages, the DC voltages, and the charging powers under the different bus voltage setting values to obtain a fitting relationship between the bus voltage setting values, the AC voltages, the DC voltages, and the charging powers; and
  calculating, according to the fitting relationship, the target bus voltage value, the target AC voltage value, and the target DC voltage value at the maximum charging power.

Optionally, the respectively calculating, according to the actual output power and the output power demand value, AC voltages when output power of the DC-AC module reaches the output power demand value under a plurality of different bus voltage setting values may include:
  acquiring, according to the output power demand value and the plurality of different bus voltage setting values, maximum conversion efficiencies respectively corresponding to the DC-AC module when the output power of the DC-AC module reaches the output power demand value under the different bus voltage setting values; and
  calculating the AC voltages under the different bus voltage setting values, the AC voltages being AC-side voltages when the DC-AC module reaches the maximum conversion efficiencies.

Optionally, the respectively calculating, according to the actual output power and the output power demand value, DC voltages under a plurality of different bus voltage setting values may include:
  acquiring maximum conversion efficiencies of the photovoltaic systems under the different bus voltage setting values according to the actual output power of the photovoltaic systems and the plurality of different bus voltage setting values;
  calculating remaining powers of the DC bus under the different bus voltage setting values according to the actual output power of the photovoltaic systems, the maximum conversion efficiencies of the photovoltaic systems, the maximum conversion efficiencies respectively corresponding to the DC-AC module, and the AC voltages under the different bus voltage setting values;
  acquiring maximum conversion efficiencies of the DC-DC module under the different bus voltage setting values according to the different bus voltage setting values and the remaining powers of the DC bus under the different bus voltage setting values; and
  calculating DC voltages under the different bus voltage setting values, the DC voltages being the charging voltages of the energy storage module when the DC-DC module reaches the maximum conversion efficiencies.

Optionally, the optical storage DC coupling control system is further connected to a collection module, and the acquiring actual output power of the photovoltaic systems may include:
  receiving current values and voltage values of the photovoltaic systems collected by the collection module; and
  calculating the actual output power of the photovoltaic systems according to the current values and the voltage values of the photovoltaic systems.

In yet another aspect, the present application further provides an optical storage DC coupling control system, including a processor, a memory, and programs or instructions stored on the memory and executable on the processor, wherein the programs or instructions, when executed by the processor, implement steps of the optical storage DC coupling control method in the foregoing aspect.

In still another aspect, the present application further provides an optical storage DC coupling control system, configured to perform steps of the optical storage DC coupling control method in the foregoing aspect.

In a further aspect, the present application further provides a readable storage medium storing programs or instructions which, when executed by a processor, implement steps of the optical storage DC coupling control method in the foregoing aspect.

In a further aspect, the present application further provides a computer program product which is executable by a processor to implement steps of the optical storage DC coupling control method in the foregoing aspect.

The above descriptions are merely an overview of the technical solutions of the present application. In order to more clearly understand the technical means of the present application for implementation in accordance with the content of specification and to more readily understand above and other objectives, features, and advantages of the present application, specific implementations of the present application are provided hereinafter.

BRIEF DESCRIPTION OF THE DRAWINGS

In order to more clearly illustrate the technical solutions in embodiments of the present application, the accompanying drawings required to be used in the description of the embodiments of the present application will be briefly introduced below. It is apparent that, the accompanying drawings in the following description are only some embodiments of the present application, and other drawings can be obtained by those of ordinary skill in the art from the provided drawings without creative efforts.

Figure 1:
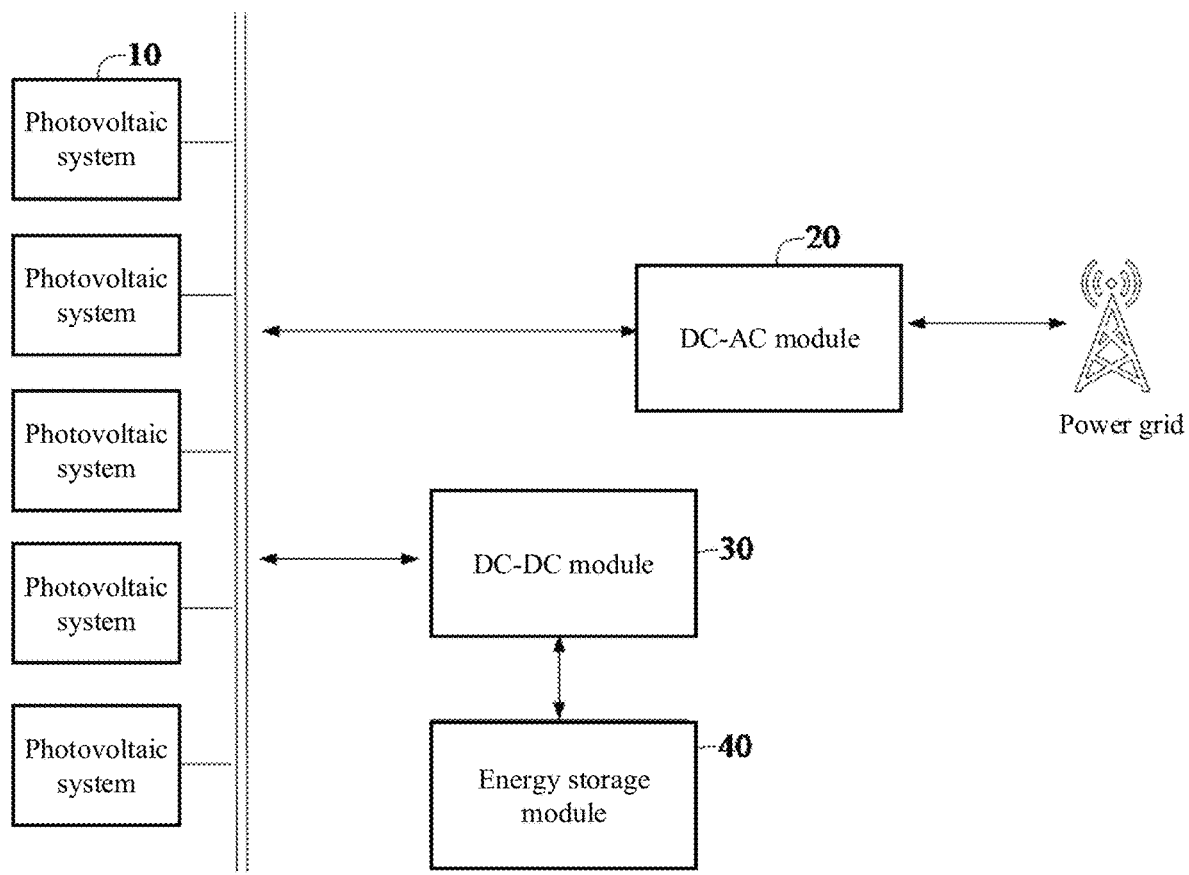
FIG. 1 is a schematic structural diagram of an optical storage DC coupling system according to an embodiment of the present application.

In the accompanying drawings, the accompanying drawings are not necessarily drawn to actual scale.

REFERENCE SIGNS photovoltaic system 10, DC-AC module 20, DC-DC module 30, energy storage module 40, control module 50, collection module 60.

DETAILED DESCRIPTION

Embodiments of the technical solutions of the present application will be described in detail below in conjunction with the accompanying drawings. The following embodiments are only used to illustrate the technical solutions of the present application more clearly, and therefore are only examples, rather than limiting the protection scope of the present application.

Unless defined otherwise, all technical and scientific terms used herein have the same meanings as would generally understood by those skilled in the technical field of the present application. The terms used herein are for the purpose of describing specific embodiments only, and are not intended to limit the present application. The terms "comprise/include" and "have" in the specification and claims of the present application and the description of the above accompanying drawings and any variations thereof are intended to cover non-exclusive inclusion.

In the descriptions of the embodiments of the present application, the technical terms "first", "second", and the like are used only to distinguish different objects, and cannot be understood as indicating or implying relative importance or implicitly indicating a quantity, specific order, or a primary and secondary relationship of the indicated technical features. In the descriptions of the embodiments of the present application, "a plurality of" means more than two, unless otherwise clearly and specifically defined.

Reference to an "embodiment" herein means that a specific feature, structure or characteristic described in conjunction with an embodiment may be included in at least one embodiment of the present application. The phrase shown in various locations in the specification may not necessarily refer to a same embodiment, and is not an independent or alternative embodiment exclusive of another embodiment. It is explicitly and implicitly understood by those skilled in the art that the embodiments described herein may be combined with another embodiment.

In the descriptions of the embodiments of the present application, the term "and/or" is merely used to describe an associated relationship between associated objects and indicates that there may be three relationships. For example, A and/or B may mean A alone, A and B together, and B alone. In addition, the character "/" herein generally indicates that the associated objects are in an "or" relationship.

In the descriptions of the embodiments of the present application, the term "a plurality of" refers to more than two (including two). Similarly, "a plurality of groups" refers to more than two groups (including two groups), and "a plurality of pieces" refers to more than two pieces (including two pieces).

In the descriptions of the embodiments of the present application, the orientation or position relationships indicated by the technical terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", and the like are based on the orientation or position relationships shown in the accompanying drawings and are intended to facilitate the description of the embodiments of the present application and simplify the description only, rather than indicating or implying that the apparatus or element referred to must have a particular orientation or be constructed and operated in a particular orientation, and therefore are not to be interpreted as limitations on the embodiments of the present application.

In the descriptions of the embodiments of the present application, unless otherwise specifically stated and limited, the terms "mounting," "joining," "connection", "fixation" and the like should be understood in a broad sense, such as, a fixed connection, a detachable connection, or an integral connection; a mechanical connection, or an electrical connection; or a direct connection, an indirect connection through an intermediate medium, internal communication between two elements, or an interaction relationship between two elements. For those of ordinary skill in the art, the specific meanings of the foregoing terms in the embodiments of the present application can be understood according to specific circumstances.

In the field of new energy, a power battery may be used as a main power source of an electrical apparatus (such as a vehicle, a ship, or a spacecraft), while an energy storage battery may be used as a charging source of the electrical apparatus. The importance of both is self-evident. As an example but not a limitation, in some application scenarios, the power battery may be a battery in the electrical apparatus, and the energy storage battery may be a battery in a charging apparatus. For ease of description, the power battery and the energy storage battery may be collectively referred to as batteries hereinafter.

In the field of photovoltaic power generation, the battery may be used as an energy storage module to form an optical storage system together with a photovoltaic system. The optical storage system may provide a stable AC voltage for the power grid.

When the photovoltaic system generates excessively much power, the battery may perform charging as the energy storage module. When the photovoltaic system generates excessively little power, the battery assists the photovoltaic system in providing stable voltage output for the power grid. Therefore, the energy storage module similar to the battery has important applications in photovoltaic power generation. Certainly, the energy storage module may alternatively include another element or system having an energy storage function such as a super capacitor.

Referring to FIG. 1, FIG. 1 is an optional architecture design diagram of an optical storage DC coupling system according to the present application. The optical storage DC coupling system is included in the optical storage system mentioned above.

The optical storage DC coupling system may include a Direct Current-Direct Current (DC-DC) module 30, a Direct Current-Alternating Current (DC-AC) module 20, an energy storage module 40, and a plurality of photovoltaic systems 10. The plurality of photovoltaic systems 10 may convert solar energy into electrical energy, and then a DC bus voltage may be outputted via output terminals of the photovoltaic systems 10. A DC side of the DC-AC module 20 may be connected to the output terminals of the plurality of photovoltaic systems 10 via a DC bus, and an AC side of the DC-AC module 20 is connected to a power grid. The DC-DC module 30 may be a bidirectional DC-DC module 30, of which a first terminal may be connected to the output terminals of the photovoltaic systems 10, and a second terminal may be connected to the energy storage module 40.

In some optional examples, a transformer may also be provided, the AC side of the DC-AC module 20 may be connected to an input terminal of the transformer, and an output terminal of the transformer may be connected to the power grid, so that a finally outputted AC voltage is adapted to a voltage of the power grid. The energy storage module 40 may be an energy storage element such as a battery and/or a super capacitor.

The above photovoltaic system 10 may include a photovoltaic panel and a Maximum Power Point Tracking (MPPT) unit. The photovoltaic panels in the plurality of photovoltaic systems 10 form a photovoltaic array.

In the related art, the MPPT unit may perform MPPT through voltage and current detection, obtain its own optimal efficiency conversion point, and schedule and control input of the DC-DC module 30 according to its own optimal efficiency conversion point, so that the DC-DC module 30 charges the energy storage module 40 according to its own efficiency point when the input is determined. In other words, a control strategy in the related art often considers optimal efficiency of a single module. In this case, the photovoltaic system 10 charges the energy storage module 40 with less power, and it is difficult to meet an energy storage demand of the energy storage module 40.

Figure 2:
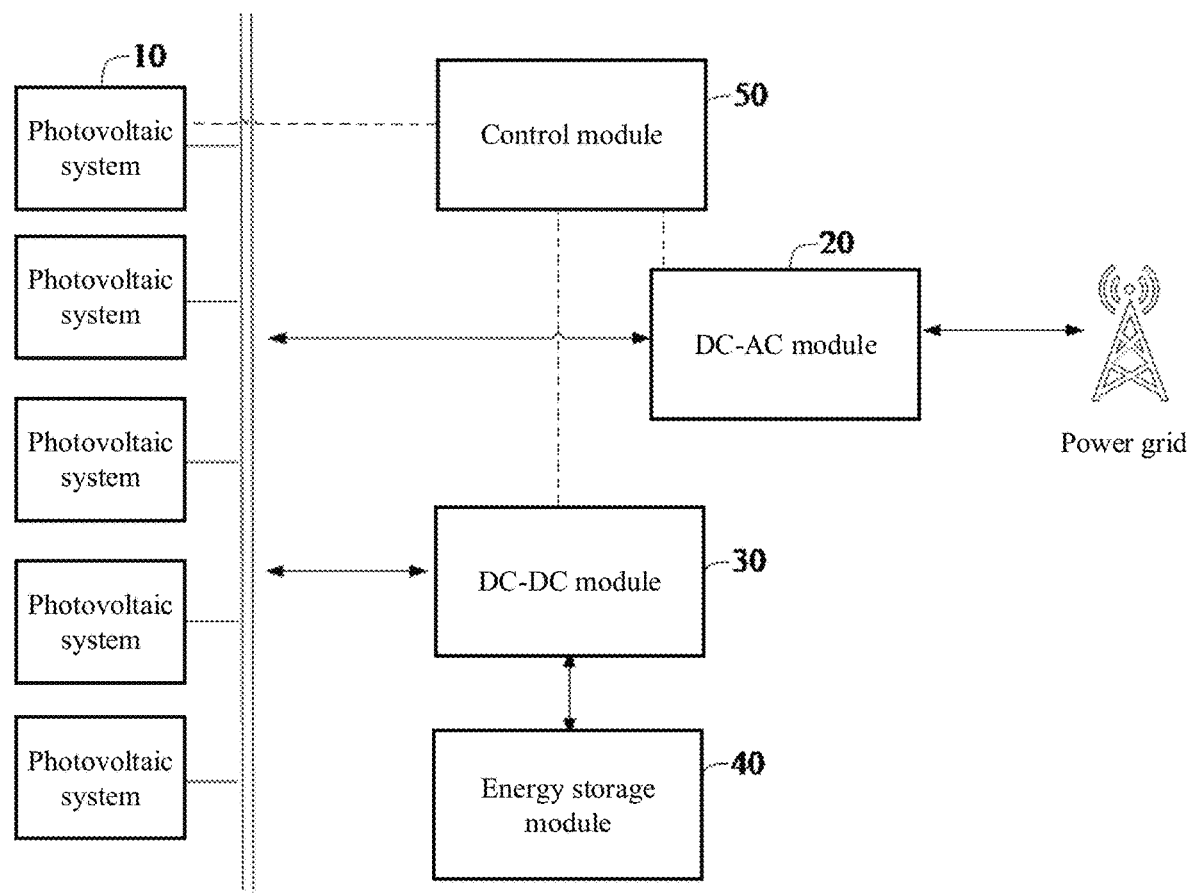
FIG. 2 is a schematic structural diagram of an optical storage DC coupling control circuit according to an optional embodiment of the present application.

In order to solve the above problem, the present application provides an optical storage DC coupling control circuit based on the structure shown in FIG. 1. Referring to FIG. 1 and FIG. 2 together, FIG. 2 is a schematic diagram of an optional circuit structure of an optical storage DC coupling control circuit. In an optional embodiment, the optical storage DC coupling control circuit includes: a DC-AC module 20, a DC-DC module 30, and a control module 50.

It is to be noted that, in addition to each module in the optical storage DC coupling control circuit and connection structure described above, there is also provided with the control module 50 in the present application. The control module 50 may be connected to the DC-DC module 30, the DC-AC module 20, and a plurality of photovoltaic systems 10. Exemplarily, the control module 50 may be connected to the DC-DC module 30, the DC-AC module 20, and the plurality of photovoltaic systems 10 through a Controller Area Network (CAN) bus.

Based on the structures shown in FIG. 1 and FIG. 2, a DC side of the DC-AC module 20 in the present application and a first terminal of the DC-DC module 30 may be connected to a DC bus and connected to the plurality of photovoltaic systems via the DC bus. The DC-AC module 20 may convert a DC voltage obtained from the DC bus into AC power which is transmitted to the power grid through an AC side of the DC-AC module 20. When power generated by the plurality of photovoltaic systems 10 is higher than power consumption of the power grid, the DC-DC module 30, after being connected to the DC bus, may convert the DC voltage obtained from the DC bus to charge the energy storage module 40.

The above control module 50 may be an Energy Management System (EMS) or may be a dedicated control device/system with a computing capability connected to the photovoltaic systems 10, the DC-DC module 30, and the DC-AC module 20. For example, the control module 50 may be a cloud server, or a system including a similar energy management apparatus and a cloud server. The DC-AC module 20 may be a photovoltaic inverter. The control module 50 may schedule and control the DC-DC module 30, the DC-AC module 20, and the plurality of photovoltaic systems 10 in the optical storage DC coupling system.

The control module 50 may acquire an actual output power(s) of the plurality of photovoltaic systems 10 and an output power demand value of the DC-AC module 20, for example, an actual output power of each photovoltaic system 10 and an output power demand value of the DC-AC module 20, and respectively calculate, according to the actual output power and the output power demand value, AC voltages and DC voltages when output power of the DC-AC module 20 reaches the output power demand value under a plurality of different bus voltage setting values. The AC voltages are AC-side output voltages when the DC-AC module 20 reaches maximum conversion efficiencies, and the DC voltages are charging voltages of the energy storage module 40 when the DC-DC module 30 reaches maximum conversion efficiencies.

The control module 50 may be further configured to determine, according to the different bus voltage setting values and the AC voltages and the DC voltages under the different bus voltage setting values, a target bus voltage value, a target AC voltage value, and a target DC voltage value when the energy storage module 40 reaches maximum charging power, and control the plurality of photovoltaic systems 10, the DC-AC module 20, and the DC-DC module 30 to perform output correspondingly according to the target bus voltage value, the target AC voltage value, and the target DC voltage value.

The above control module 50 may acquire electrical parameters of the photovoltaic systems 10, and obtain the actual output power of the photovoltaic systems 10 according to the acquired electrical parameters. The electrical parameters may include a power, a current, a voltage, and the like.

The output power demand value of the DC-AC module 20 is an output power value that meets an energy demand of the power grid. The output power demand value is greater than or equal to a minimum power demand value of the power grid, whose specific value may be set according to an actual requirement. Exemplarily, if the minimum power demand value of the power grid is 250 kw, the output power demand value is $P_{AC} \geq 250$ kw. In another example, the output power demand value may be 250 kw. The output power demand value is one of the output constraints for scheduling control over the optical storage DC coupling system, so that, finally, the AC power outputted by the DC-AC module 20 meets a minimum power demand of the power grid after the scheduling control.

The plurality of different bus voltage setting values above are bus voltage analog values set by the control module 50, whose specific values and quantity may be set according to an actual requirement. Exemplarily, 100 bus voltage setting values with different magnitudes may be set.

The control scheme of the present application is described below in conjunction with a specific control principle.

Referring to FIG. 1 and FIG. 2 together, according to an architecture of the optical storage DC coupling system, an energy balance model of the entire system may be established. The energy balance model includes: an energy conservation formula that the plurality of photovoltaic systems 10 satisfy, that is, the following Formula (1), and an energy conservation formula from the DC bus to the energy storage module 40 and the DC-AC module 20, that is, the following Formula (2).

$$\sum_{i=1}^{n} \alpha_i * P_{pv-i} = P_{DC} \quad (1)$$

where n denotes a total quantity of the photovoltaic systems 10, $\alpha_i$ denotes energy conversion efficiency of an $i^{th}$ photovoltaic system 10 for DC bus output (also called MPPT conversion efficiency), $P_{pv-i}$ denotes actual power generated by the $i^{th}$ photovoltaic system 10, and $P_{DC}$ denotes DC bus power.

$$P_{DC} = P_{Bat}/\alpha_{DC-Bat} + P_{AC}/\alpha_{DC-AC} \quad (2)$$

where $P_{DC}$ denotes DC bus power, $P_{Bat}$ denotes charging power of the energy storage module 40, $\alpha_{DC-Bat}$ denotes conversion efficiency of the DC-DC module 30 (also called energy conversion efficiency from the DC bus to the energy storage module 40), $P_{AC}$ denotes AC-side power of the DC-AC module 20, and $\alpha_{DC-AC}$ denotes conversion efficiency of the DC-AC module 20 (also called energy conversion efficiency from the DC bus to the power grid).

In order to supply power to the energy storage module 40 as much as possible on the premise of meeting a basic electricity demand of the power grid (that is, AC-side output power of the DC-AC module 20 has to reach the output power demand value), the charging power of the energy storage module 40 is required to be as high as possible. That is, a final adjustment optimization objective may be expressed in the form of Formula (3).

$$z = \max(P_{Bat}) \quad (3)$$

After the parameters of Formula (1) and Formula (2) are substituted, Formula (3) may be expressed as the following Formula (4), that is, $$z = \max\left\{\left(\sum_{i=1}^{n} \alpha_i * P_{pv-i} - P_{AC}/\alpha_{DC-AC}\right) * \alpha_{DC-Bat}\right\} \quad (4)$$

where $P_{Bat}$ denotes charging power of the energy storage module 40, z denotes an adjustment optimization objective, that is, maximum charging power of the energy storage module 40, $\alpha_i$ denotes energy conversion efficiency of an $i^{th}$ photovoltaic system 10 for DC bus output (also called MPPT conversion efficiency), $P_{pv-i}$ denotes actual power generated by the $i^{th}$ photovoltaic system 10, $P_{AC}$ denotes AC-side power of the DC-AC module 20, whose value is the output power demand value, $\alpha_{DC-AC}$ denotes conversion efficiency of the DC-AC module 20 (also called energy conversion efficiency from the DC bus to the power grid), and $\alpha_{DC-Bat}$ denotes conversion efficiency of the DC-DC module 30 (also called energy conversion efficiency from the DC bus to the energy storage module 40).

Therefore, it may be found based on Formula (4) that, when the actual output power of the photovoltaic systems 10 and the output power demand value of the DC-AC module 20 are known, how to maximize a charging capacity of the energy storage module 40 on the premise that power outputted by the optical storage DC coupling system meets a basic requirement of the power grid is to determine reasonable conversion efficiencies of the plurality of photovoltaic systems 10, the DC-DC module 30, and the DC-AC module 20 to enable the charging power of the energy storage module 40 to reach the maximum charging power.

Therefore, prior to the scheduling control, a plurality of different bus voltage setting values may be preset, and then corresponding output voltages when the DC-DC module 30 and the DC-AC module 20 respectively reach the maximum conversion efficiencies are calculated on the assumption that an output bus voltage of the photovoltaic systems 10 reaches respective bus voltage setting value and the output power of the DC-AC module 20 reaches the output power demand value. It may be understood that the calculated output voltages when the maximum conversion efficiencies are reached are optimal solutions to related parameters of the DC-DC module 30 and the DC-AC module 20 in the optical storage DC coupling system obtained according to the actual output power of the optical storage system when the output constraint is satisfied.

Charging powers of the energy storage module 40 under the plurality of different bus voltage setting values may be further determined according to the plurality of different bus voltage setting values and output voltages when the DC-DC module 30 and the DC-AC module 20 respectively reach maximum efficiencies and associated with the bus voltage setting values when the output power of the DC-AC module 20 reaches the output power demand value, and the target bus voltage value, the target AC voltage value, and the target DC voltage value when the energy storage module 40 reaches the maximum charging power are finally found. The target bus voltage value, the target AC voltage value, and the target DC voltage value determined are scheduling control parameters when the plurality of photovoltaic systems 10, the DC-DC modules 30, and the DC-AC modules 20 maximize the charging power of the energy storage module 40 under reasonable conversion efficiency.

It may be understood that, since the plurality of different bus voltage setting values are firstly assumed and the optimal solutions to the related parameters of the DC-DC module 30 and the DC-AC module 20 are resolved accordingly, finally, in the case of determining the maximum charging power and optimal solutions to output voltages of the DC-DC module 30 and the DC-AC module 20 (that is, a target DC voltage and a target AC voltage) when the energy storage module 40 reaches the maximum charging power, a target bus voltage value of the plurality of photovoltaic systems 10 is an optimal solution to bus voltages when the plurality of photovoltaic systems 10 reach the reasonable conversion efficiency.

Finally, the control module 50 may send the obtained target bus voltage value to the plurality of photovoltaic systems 10, send the obtained target DC voltage to the DC-DC module 30, and send the obtained target AC voltage to the DC-AC module 20, so that the plurality of photovoltaic systems 10 perform output according to the target bus voltage value, the DC-DC module 30 performs output according to the target DC voltage value, and the DC-AC module 20 performs output according to the target AC voltage value.

When the plurality of photovoltaic systems 10, the DC-DC module 30, and the DC-AC module 20 respectively reach the target bus voltage value, the target AC voltage value, and the target DC voltage value, the energy storage module 40 reaches the maximum charging power.

In some optional examples, in calculating the charging voltage of the energy storage module 40 when the DC-DC module 30 reaches the maximum conversion efficiencies under the different bus voltage setting values, a power constraint may also be set, so that parameters finally calculated satisfy both the output constraint and the power constraint. The power constraint may be that charging power of the energy storage module 40 during charging is less than or equal to a maximum charging power limit of the energy storage module 40, thereby ensuring that a charging voltage outputted by the DC-DC module 30 after scheduling control enables the energy storage module 40 to be safely charged.

In the technical solution of the present application, the corresponding output voltages when the DC-DC module 30 and the DC-AC module 20 respectively reach the maximum conversion efficiencies when the output power of the DC-AC module 20 reaches the output power demand value under the different bus voltage setting values are calculated by the control module 50 according to the actual output power of the plurality of photovoltaic systems 10 and the output power demand value of the DC-AC module 20. The target bus voltage value, the target AC voltage value, and the target DC voltage value when the energy storage module 40 reaches the maximum charging power can be obtained. Then the plurality of photovoltaic systems 10, the DC-AC module 20, and the DC-DC module 30 are controlled to perform output correspondingly according to the target bus voltage value, the target AC voltage value, and the target DC voltage value. Therefore, from the aspect of the entire optical storage DC coupling system, the DC-DC module 30, the photovoltaic systems 10, and the DC-AC module 20 can be considered in a balanced manner, thus the highest charging power when all aspects of the entire optical storage DC coupling system reach an optimal efficiency point is found, so that the photovoltaic systems 10 supply power to the energy storage device as much as possible while meeting the basic energy demand of the power grid, so as to solve the problem that the scheduling control scheme in the related art is difficult to meet an energy storage demand of the energy storage module 40.

Figure 3:
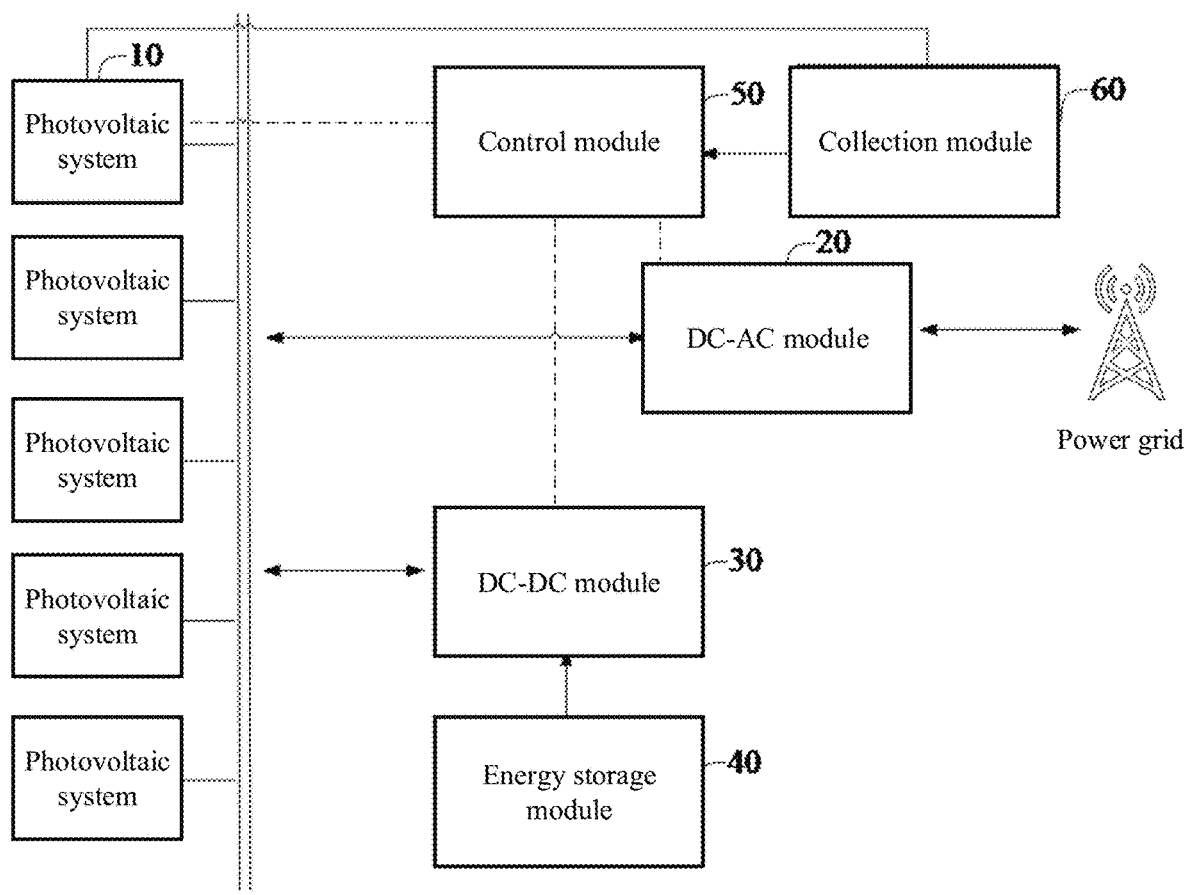
FIG. 3 is a schematic structural diagram of the optical storage DC coupling control circuit according to another optional embodiment of the present application.

Referring to FIG. 3, FIG. 3 is a schematic structural diagram of another embodiment of the optical storage DC coupling control circuit proposed on the basis of the above embodiments. In this embodiment, the optical storage DC coupling control circuit further includes a collection module 60.

The collection module 60 is connected to the control module 50. The collection module 60 may be configured to collect and send current values and voltage values of the photovoltaic systems 10.

The control module 50 may be further configured to calculate the actual output power of the photovoltaic systems 10 according to the current values and the voltage values of the photovoltaic systems 10.

It is to be noted that the above collection module 60 may include a current sensor and a voltage sensor. Currents of the photovoltaic systems 10 may be detected by the current sensor, and voltages of the photovoltaic systems 10 may be detected by the voltage sensor. After the current sensor and the voltage sensor respectively measure the current values and the voltage values, electrical parameters measured by the sensor may be sent to the control module 50 through a collection unit of the collection module 60. In some other optional examples, a sampling resistor may alternatively be disposed on a line where the photovoltaic systems 10 are located, and the current values and the voltage values of the photovoltaic systems 10 are collected through the sampling resistor.

The above control module 50 may multiply the current values and the voltage values of the photovoltaic systems 10 to obtain the actual output power of all photovoltaic systems 10, expressed in a mathematical expression, that is, the following Formula (5).

$$P_{pv-i}=U_{pv-i}*I_{pv-i} \tag{5}$$

In the embodiment of the present application, the actual output power of the photovoltaic systems 10 is calculated through the arrangement of the collection module 60 and according to the collected current values and voltage values of the photovoltaic systems 10, which provides data reference for subsequent system-based scheduling control.

Still referring to FIG. 3, yet another embodiment of the optical storage DC coupling control circuit is proposed on the basis of the above embodiments. In this embodiment, the control module 50 may be configured to acquire, according to the output power demand value and the plurality of different bus voltage setting values, maximum conversion efficiencies respectively corresponding to the DC-AC module 20 when the output power of the DC-AC module 20 reaches the output power demand value under the different bus voltage setting values.

The control module 50 may be further configured to calculate the AC voltages under the different bus voltage setting values. The AC voltages are AC-side voltages when the DC-AC module 20 reaches the maximum conversion efficiency.

When it is known that the output power of the DC-AC module 20 is required to reach the output power demand value, the maximum conversion efficiencies respectively corresponding to the DC-AC modules 20 under the different bus voltage setting values may be obtained by table look-up.

It is to be noted that the table look-up method is to query an efficiency table of the DC-AC module 20 to obtain the maximum conversion efficiency in this case. The efficiency table of the DC-AC module 20 is related to characteristics of the device, and may be obtained through testing before the device leaves the factory. On the basis of obtaining the maximum conversion efficiency, the AC-side output voltage of the DC-AC module 20 under this condition can be calculated.

In the embodiment of the present application, a specific manner of obtaining the maximum conversion efficiencies of the DC-AC module 20 and the corresponding AC-side output voltages under the different bus voltage setting values is given, which resolves an optimal solution to the output voltages of the DC-AC module 20 under the different bus voltage setting values and provides data reference for subsequent system-based scheduling control.

Still referring to FIG. 3, in still another embodiment of the optical storage DC coupling control circuit proposed in the above embodiments, the control module 50 may be configured to acquire maximum conversion efficiencies of the photovoltaic system 10 under the different bus voltage setting values according to the actual output power of the photovoltaic systems 10 and the plurality of different bus voltage setting values.

The control module 50 may be further configured to calculate remaining powers of the DC bus under the different bus voltage setting values according to the actual output power of the photovoltaic systems 10, the maximum conversion efficiencies of the photovoltaic systems 10, the maximum conversion efficiencies respectively corresponding to the DC-AC module 20, and the AC voltages under the different bus voltage setting values.

The control module 50 may be further configured to acquire maximum conversion efficiencies of the DC-DC module 30 under the different bus voltage setting values according to the different bus voltage setting values and the remaining powers of the DC bus under the different bus voltage setting values.

The control module 50 may be further configured to calculate the DC voltages under the different bus voltage setting values. The DC voltages are the charging voltages of the energy storage module 40 when the DC-DC module 30 reaches the maximum conversion efficiencies.

It is to be noted that, when the actual output power of the photovoltaic systems 10 and bus voltage setting values outputted by the plurality of photovoltaic systems 10 are known, the maximum conversion efficiencies respectively corresponding to the photovoltaic systems 10 under the different bus voltage setting values may be obtained by table look-up. The table look-up involves an efficiency table of the photovoltaic systems 10, which is also similar to the efficiency table involved in the DC-AC module 20, and is related to characteristics of the device. The obtaining of the table may be obtained with reference to the foregoing description. Details are not repeated herein.

Since the maximum conversion efficiencies of the photovoltaic systems 10 are obtained by table look-up, the DC bus power under the different bus voltage setting values may be calculated through the foregoing Formula (1). Combined with Formula (2), the DC bus power is known, the AC-side power of the DC-AC module 20 is the output power demand value of the DC-AC module 20, and the maximum conversion efficiencies of the DC-AC module 20 under the different bus voltage setting values are calculated in the foregoing embodiments, so the remaining powers of the DC bus under different DC bus setting values can be calculated. The remaining powers are input powers at the first terminal of the DC-DC module 30, that is, $P_{Bat}/\alpha_{DC\text{-}Bat}$ in Formula (2).

Based on the above calculation results, on the basis of obtaining the input power at the first terminal of the DC-DC module 30 under the different bus voltage setting values, the maximum conversion efficiencies corresponding to the DC-DC module 30 under the different bus voltage setting values may be obtained by table look-up. The table look-up involves an efficiency table of the DC-DC module 30, which is also similar to the efficiency table involved in the DC-AC module 20, and is related to characteristics of the device. The obtaining of the table may be obtained with reference to the foregoing description. Details are not repeated herein. On the basis of obtaining the maximum conversion efficiencies of the DC-DC module 30 under different conditions, an optimal solution for the second terminal of the DC-DC module 30 to provide the charging voltage to the energy storage module 40 under these conditions can be calculated, namely, DC voltages under different conditions.

In the embodiment of the present application, a specific manner of obtaining the charging voltages of the energy storage module 40 under the different bus voltage setting values when the DC-DC module 30 reaches the maximum conversion efficiencies is given, which resolves an optimal solution to the output voltages of the DC-DC module 30 under the different bus voltage setting values and provides data reference for subsequent system-based scheduling control.

Referring to FIG. 3, a further embodiment of the optical storage DC coupling control circuit is proposed on the basis of the above embodiments. In this embodiment, the control module 50 may be configured to calculate, according to the output power demand value, the actual output power, the different bus voltage setting values, and the AC voltages and the DC voltages under the different bus voltage setting values, charging powers of the energy storage module 40 under the different bus voltage setting values, to obtain a plurality of candidate charging powers.

The remaining powers of the DC bus where the bus voltage setting values are located may be calculated according to the execution manner in the foregoing embodiment through the output power demand value, the actual output power of the photovoltaic systems 10, the different bus voltage setting values, and AC voltages under the different bus voltage setting values, and then the charging powers finally outputted by the DC-DC module 30 to the energy storage module 40 are obtained according to the remaining powers of the DC bus and the maximum conversion efficiencies of the DC-DC module 30 when the DC voltages under the different bus voltage setting values are acquired and according to Formula (2).

The control module 50 may be further configured to select the maximum candidate charging power from the plurality of candidate charging powers, and acquire a bus voltage setting value, an AC voltage, and a DC voltage when the maximum candidate charging power is reached. The bus voltage setting value, the AC voltage, and the DC voltage when the maximum candidate charging power is reached correspond to the target bus voltage value, the target AC voltage value, and the target DC voltage value.

It is to be noted that this embodiment gives an implementation method of obtaining the maximum charging power and the corresponding target bus voltage value, target AC voltage value, and target DC voltage value, with a core idea of obtaining, through a plurality of different bus voltage setting values preset by the control module 50, DC voltages and AC voltages under the different bus voltage setting values and target charging power by traversal calculation, then finding various parameters when the target charging power is maximum from existing traversal results, and controlling the parameters correspondingly as parameters of various modules in the optical storage DC coupling system.

In the embodiment of the present application, the plurality of candidate charging powers are obtained by traversal calculation, and the maximum charging power is selected therefrom. The operations are simple and convenient, and a selection scheme of an optimal solution with finite parameters is given, which helps to realize the control over an optimal scheduling scheme of the optical storage DC coupling system, and can meet the energy storage demand of the energy storage module 40 to the greatest extent.

Referring to FIG. 3, a further embodiment of the optical storage DC coupling control circuit is proposed on the basis of the above embodiments. In this embodiment, the control module 50 may be configured to calculate, according to the output power demand value, the actual output power, the different bus voltage setting values, and the AC voltages and the DC voltages under the different bus voltage setting values, charging powers of the energy storage module 40 under the different bus voltage setting values.

Figure 6:
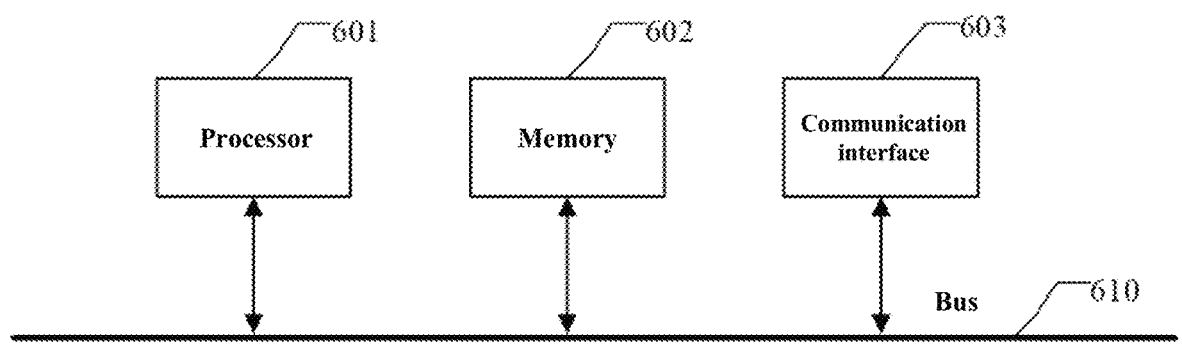
FIG. 6 is a schematic structural diagram of an optical storage DC coupling control system according to an optional embodiment of the present application.

The method for calculating the charging powers of the energy storage module 40 under the different bus voltage setting values is consistent with the method involved in FIG. 6. Details are not repeated herein.

The control module 50 may be further configured to process the different bus voltage setting values, and the AC voltages, the DC voltages, and the charging powers under the different bus voltage setting values to obtain a fitting relationship between the bus voltage setting values, the AC voltages, the DC voltages, and the charging powers, so as to calculate, according to the fitting relationship, the target bus voltage value, the target AC voltage value, and the target DC voltage value at the maximum charging power.

It is to be noted that this embodiment gives an implementation method of obtaining the maximum charging power and the corresponding target bus voltage value, target AC voltage value, and target DC voltage value, with a core idea of calculating, through a plurality of different bus voltage setting values preset by the control module 50, DC voltages and AC voltages under the different bus voltage setting values and charging powers, and then fitting a relationship between the charging powers of the energy storage module 40, the DC voltages, the AC voltages, and the bus voltage setting values, so as to obtain the fitting relationship. The fitting relationship may be a fitting equation or a fitting curve. Finally, a DC voltage, an AC voltage, and a bus voltage setting value under the maximum charging power may be calculated according to the fitting relationship, correspondingly taken as the target DC voltage value, the target AC voltage value, and the target bus voltage value.

In the embodiment of the present application, a relationship between various parameters is fitted, so that the maximum charging power of the energy storage module 40 with reasonable conversion efficiency of each device module of the optical-storage DC coupling system, and output voltage parameters of the DC-DC module 30, the DC-AC module 20, and the plurality of photovoltaic systems 10 when the maximum charging power is reached can be obtained according to the fitting relationship, so that the energy storage demand of the energy storage module 40 can be met to the greatest extent.

It is to be further noted that, in other optional examples, an optimal solution to the output voltage of each device that maximizes the charging power of the energy storage module 40 based on the consideration of the entire optical storage DC coupling system may be found with a method such as gradient descent according to different bus voltage setting values and the AC voltages, the DC voltages, and the charging powers under the different bus voltage setting values, so as to charge the energy storage module 40 as much as possible.

Figure 4:
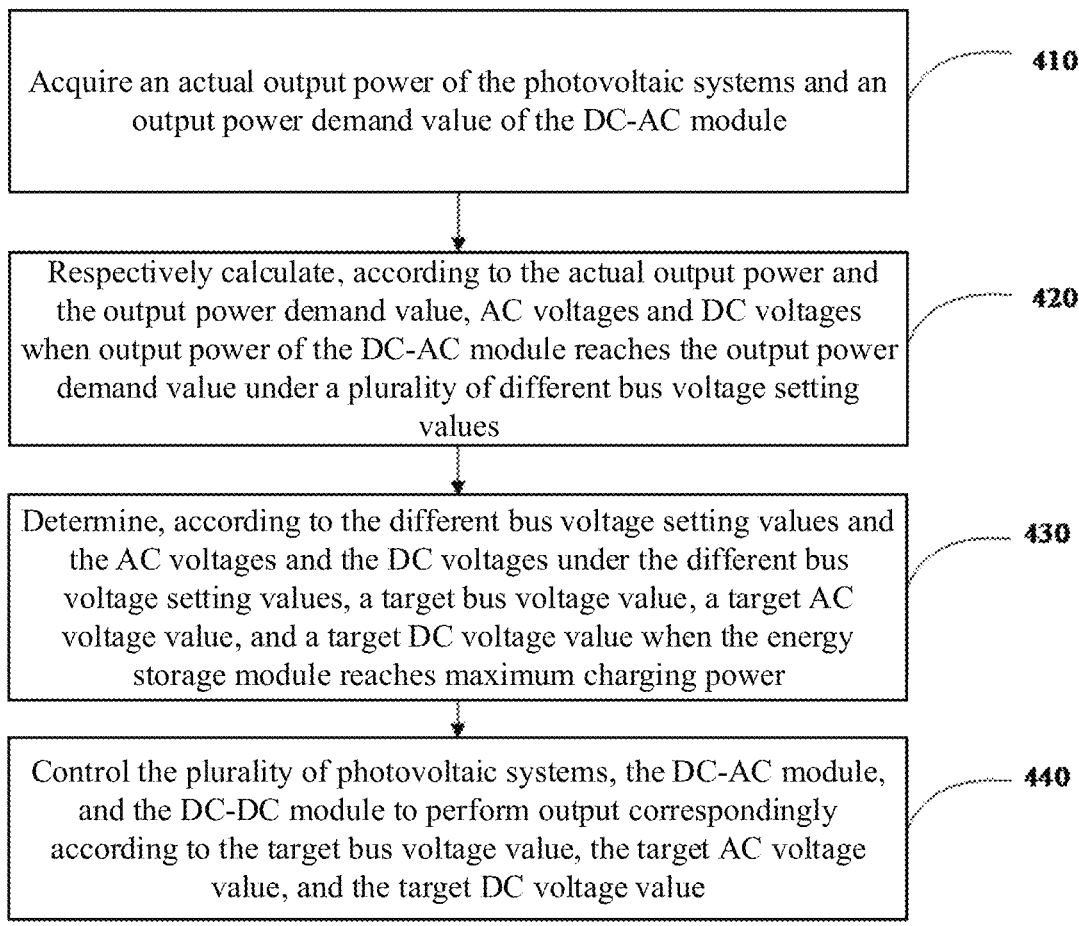
FIG. 4 is a schematic flowchart of an optical storage DC coupling control method according to an optional embodiment of the present application.

The present application further provides an optical storage DC coupling control method. In an optional embodiment, referring to FIG. 1, FIG. 2, and FIG. 4, the method is applied to an optical storage DC coupling control system (e.g., the control module in FIG. 2). The optical storage DC coupling control system is connected to a DC-AC module, a DC-DC module, and a plurality of photovoltaic systems in an optical storage DC coupling system respectively. The method includes the following steps.

In step 410, actual output power of the photovoltaic systems and an output power demand value of the DC-AC module are acquired.

In step 420, AC voltages and DC voltages when output power of the DC-AC module reaches the output power demand value under a plurality of different bus voltage setting values are respectively calculated according to the actual output power and the output power demand value. The AC voltages are AC-side output voltages when the DC-AC module reaches maximum conversion efficiencies, and the DC voltages are charging voltages of an energy storage module connected to the DC-DC module when the DC-DC module reaches maximum conversion efficiencies.

In step 430, a target bus voltage value, a target AC voltage value, and a target DC voltage value when the energy storage module reaches maximum charging power are determined according to the different bus voltage setting values and the AC voltages and the DC voltages under the different bus voltage setting values.

In step 440, the plurality of photovoltaic systems, the DC-AC module, and the DC-DC module are controlled to perform output correspondingly according to the target bus voltage value, the target AC voltage value, and the target DC voltage value.

The plurality of photovoltaic systems in the present application may convert solar energy into electrical energy to output a DC bus voltage. A DC side of the DC-AC module and a first terminal of the DC-DC module may be connected to a DC bus. The DC-AC module may convert a DC voltage obtained from the DC bus into AC power which is transmitted to the power grid through an AC side of the DC-AC module. When power generated by the plurality of photovoltaic systems is higher than power consumption of the power grid, the DC-DC module, after being connected to the DC bus, may perform voltage conversion to the DC voltage obtained from the DC bus to charge the energy storage module.

The above control module may be an Energy Management System (EMS) or may be a dedicated control device/system with a computing capability connected to the photovoltaic systems, the DC-DC module, and the DC-AC module. For example, the control module may be a cloud server, or a system including a similar energy management apparatus and a cloud server. The DC-AC module may be a photovoltaic inverter. The control module may schedule and control the DC-DC module, the DC-AC module, and the plurality of photovoltaic systems in the optical storage DC coupling system.

The above control module may acquire electrical parameters of the photovoltaic systems, and obtain the actual output power of the photovoltaic systems according to the acquired electrical parameters. The electrical parameters may include a power, a current, a voltage, and the like.

The output power demand value of the DC-AC module is an output power value that meets an energy demand of the power grid. The output power demand value is greater than or equal to a minimum power demand value of the power grid, whose specific value may be set according to an actual requirement. Exemplarily, if the minimum power demand value of the power grid is 250 kw, the output power demand value is $P_{AC} \geq 250$ kw. In another example, the output power demand value may be 250 kw. The output power demand value is one of the output constraints for scheduling control over the optical storage DC coupling system, so that, finally, the AC power outputted by the DC-AC module meets a minimum power demand of the power grid after the scheduling control.

The plurality of different bus voltage setting values above are bus voltage analog values set by the control module, whose specific values and quantity may be set according to an actual requirement. Exemplarily, 100 bus voltage setting values with different magnitudes may be set.

A specific control principle of the method has been described in the foregoing optical storage DC coupling control circuit. Details are not repeated herein. Therefore, it may be found based on the foregoing control principle that, when the actual output power of the photovoltaic systems and the output power demand value of the DC-AC module are known, how to maximize a charging capacity of the energy storage module on the premise that power outputted by the optical storage DC coupling system meets a basic requirement of the power grid is to determine reasonable conversion efficiencies of the plurality of photovoltaic systems, the DC-DC module, and the DC-AC module to enable the charging power of the energy storage module to reach the maximum charging power.

Therefore, prior to the scheduling control, a plurality of different bus voltage setting values may be preset, and then corresponding output voltages when the DC-DC module and the DC-AC module respectively reach the maximum conversion efficiencies are calculated on the assumption that an output bus voltage of the photovoltaic systems reaches respective bus voltage setting value and the output power of the DC-AC module reaches the output power demand value. It may be understood that the calculated output voltages when the maximum conversion efficiencies are reached are optimal solutions to related parameters of the DC-DC module and the DC-AC module in the optical storage DC coupling system obtained according to the actual output power of the optical storage system when the output constraint is satisfied.

Charging powers of the energy storage module under the plurality of different bus voltage setting values may be further determined according to the plurality of different bus voltage setting values and output voltages when the DC-DC module and the DC-AC module respectively reach maximum efficiencies and associated with respective bus voltage setting values when the output power of the DC-AC module reaches the output power demand value. The target bus voltage value, the target AC voltage value, and the target DC voltage value when the energy storage module reaches the maximum charging power are finally found. The target bus voltage value, the target AC voltage value, and the target DC voltage value determined are scheduling control parameters when the plurality of photovoltaic systems, the DC-DC module, and the DC-AC module maximize the charging power of the energy storage module under reasonable conversion efficiency.

It may be understood that, since the plurality of different bus voltage setting values are firstly assumed and the optimal solutions to the related parameters of the DC-DC module and the DC-AC module are resolved accordingly, finally, in the case of determining the maximum charging power and optimal solutions to output voltages of the DC-DC module and the DC-AC module (that is, a target DC voltage and a target AC voltage) when the energy storage module reaches the maximum charging power, a target bus voltage value of the plurality of photovoltaic systems is an optimal solution to bus voltages when the plurality of photovoltaic systems reach the reasonable conversion efficiency.

Finally, the control module may send the obtained target bus voltage value to the plurality of photovoltaic systems, send the obtained target DC voltage to the DC-DC module, and send the obtained target AC voltage to the DC-AC module, so that the plurality of photovoltaic systems perform output according to the target bus voltage value, the DC-DC module performs output according to the target DC voltage value, and the DC-AC module performs output according to the target AC voltage value.

When the plurality of photovoltaic systems, the DC-DC module, and the DC-AC module respectively reach the target bus voltage value, the target AC voltage value, and the target DC voltage value, the energy storage module reaches the maximum charging power.

In some optional examples, in calculating the charging voltage of the energy storage module when the DC-DC module reaches the maximum conversion efficiencies under the different bus voltage setting values, a power constraint may also be set, so that parameters finally calculated satisfy both the output constraint and the power constraint. The power constraint may be that charging power of the energy storage module during charging is less than or equal to a maximum charging power limit of the energy storage module, thereby ensuring that a charging voltage outputted by the DC-DC module after scheduling control enables the energy storage module to be safely charged.

In the technical solution of the present application, the corresponding output voltages when the DC-DC module and the DC-AC module respectively reach the maximum conversion efficiencies when the output power of the DC-AC module reaches the output power demand value under the different bus voltage setting values are calculated by the control module according to the actual output power of the plurality of photovoltaic systems and the output power demand value of the DC-AC module. The target bus voltage value, the target AC voltage value, and the target DC voltage value when the energy storage module reaches the maximum charging power can be obtained. Then the plurality of photovoltaic systems, the DC-AC module, and the DC-DC module are controlled to perform output correspondingly according to the target bus voltage value, the target AC voltage value, and the target DC voltage value. Therefore, from the aspect of the entire optical storage DC coupling system, the DC-DC module, the photovoltaic systems, and the DC-AC module can be considered in a balanced manner, thus the highest charging power when all aspects of the entire optical storage DC coupling system reach an optimal efficiency point is found, so that the photovoltaic system supplies power to the energy storage device as much as possible while meeting the basic energy demand of the power grid, so as to solve the problem that the scheduling control scheme in the related art is difficult to meet an energy storage demand of the energy storage module.

Figure 5:
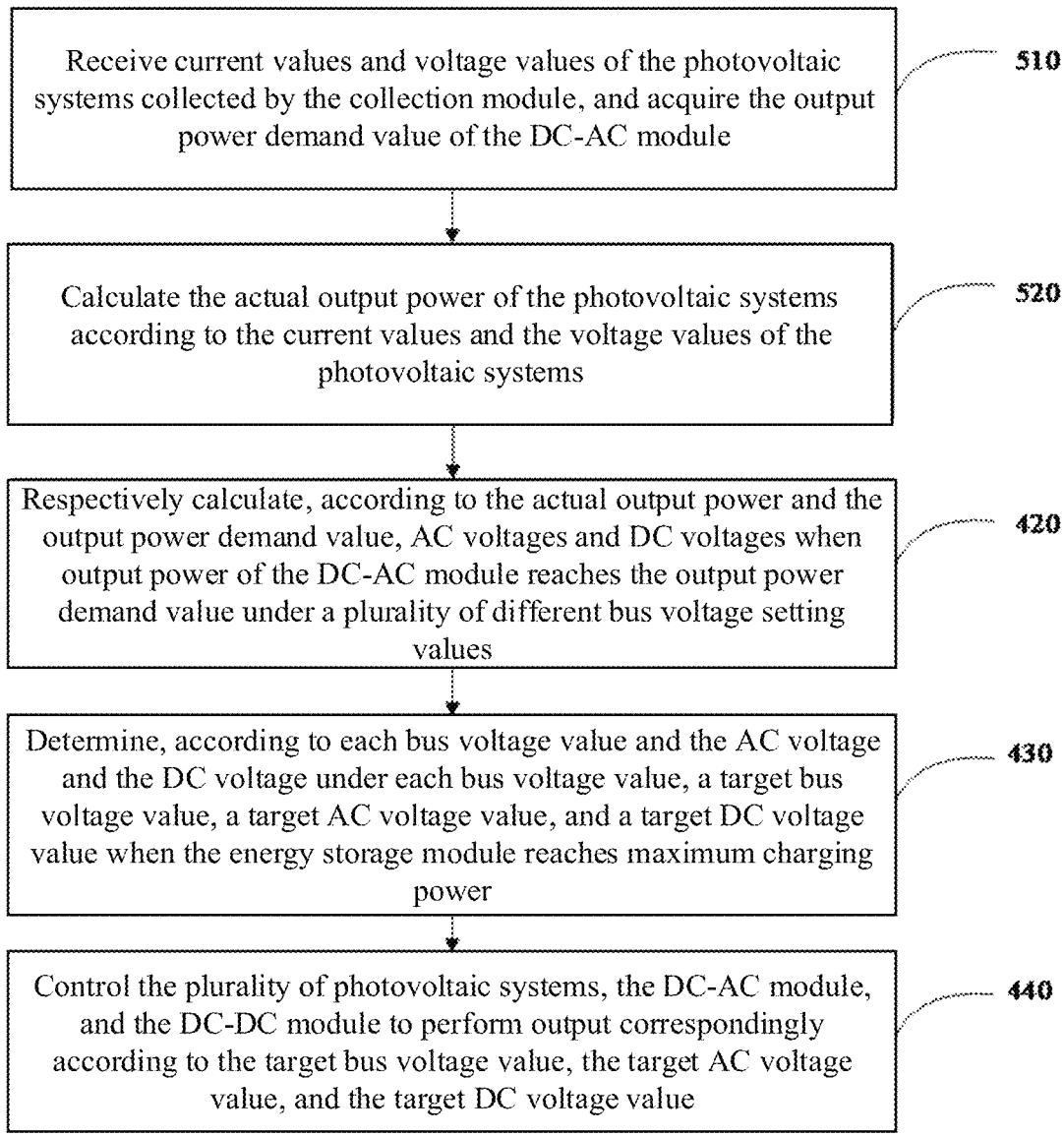
FIG. 5 is a schematic flowchart of the optical storage DC coupling control method according to another optional embodiment of the present application.

Referring to FIG. 5, FIG. 5 is a schematic flowchart of another embodiment of the optical storage DC coupling control method proposed based on the above embodiments. In the method, the energy management apparatus is connected to the collection module. In step 410 above, the acquiring actual output power of the photovoltaic systems and an output power demand value of the DC-AC module may include the following steps.

In step 510, current values and voltage values of the photovoltaic systems collected by the collection module are received, and the output power demand value of the DC-AC module is acquired.

In step 520, the actual output power of the photovoltaic systems is calculated according to the current values and the voltage values of the photovoltaic systems.

It is to be noted that the above collection module may include a current sensor and a voltage sensor. Currents of the photovoltaic systems may be detected by the current sensor, and voltages of the photovoltaic systems may be detected by the voltage sensor. After the current sensor and the voltage sensor respectively measure the current values and the voltage values, electrical parameters measured by the sensor may be sent to the control module through a collection unit of the collection module. In some other optional examples, a sampling resistor may alternatively be disposed on a line where the photovoltaic systems are located, and the current values and the voltage values of the photovoltaic system are collected through the sampling resistor.

The above control module may multiply the current values and the voltage values of the photovoltaic systems to obtain the actual output power of the photovoltaic systems.

In the embodiment of the present application, the actual output power of the photovoltaic systems is calculated through the arrangement of the collection module and according to the collected current values and voltage values of the photovoltaic systems, which provides data reference for subsequent system-based scheduling control.

Further, in yet another embodiment of the optical storage DC coupling control method proposed based on the above embodiment, step 410 includes:

acquiring, according to the output power demand value and the plurality of different bus voltage setting values, maximum conversion efficiencies respectively corresponding to the DC-AC module when the output power of the DC-AC module reaches the output power demand value under the different bus voltage setting values; and calculating the AC voltages under the different bus voltage setting values, the AC voltages being AC-side voltages when the DC-AC module reaches the maximum conversion efficiencies;

acquiring maximum conversion efficiencies of the photovoltaic systems under the different bus voltage setting values according to the actual output power of the photovoltaic systems and the plurality of different bus voltage setting values;

calculating remaining powers of the DC bus under the different bus voltage setting values according to the actual output power of the photovoltaic systems, the maximum conversion efficiencies of the photovoltaic systems, the maximum conversion efficiencies respectively corresponding to the DC-AC module, and the AC voltages under the different bus voltage setting values;

acquiring maximum conversion efficiencies of the DC-DC module under the different bus voltage setting values according to the different bus voltage setting values and the remaining powers of the DC bus under the different bus voltage setting values; and calculating DC voltages under the different bus voltage setting values, the DC voltages being the charging voltages of the energy storage module when the DC-DC module reaches the maximum conversion efficiencies.

When it is known that the output power of the DC-AC module is required to reach the output power demand value, the maximum conversion efficiencies respectively corresponding to the DC-AC modules under the different bus voltage setting values may be obtained by table look-up.

It is to be noted that the table look-up method is to query an efficiency table of the DC-AC module to obtain the maximum conversion efficiencies in this case. The efficiency table of the DC-AC module is related to characteristics of the device, and may be obtained through testing before the device leaves the factory. On the basis of obtaining the maximum conversion efficiency, the AC-side output voltage of the DC-AC module under this condition can be calculated.

In the embodiment of the present application, a specific manner of obtaining the maximum conversion efficiencies of the DC-AC module and the corresponding AC-side output voltages under the different bus voltage setting values is given, which resolves an optimal solution to the output voltages of the DC-AC module under the different bus voltage setting values and provides data reference for subsequent system-based scheduling control.

It is to be noted that, when the actual output power of the photovoltaic systems and bus voltage setting values outputted by the plurality of photovoltaic systems are known, the maximum conversion efficiencies respectively corresponding to the photovoltaic systems under the different bus voltage setting values may be obtained by table look-up. The table look-up involves an efficiency table of the photovoltaic systems, which is also similar to the efficiency table involved in the DC-AC module, and is related to characteristics of the device. The obtaining of the table may be obtained with reference to the foregoing description. Details are not repeated herein.

Since the maximum conversion efficiencies of the photovoltaic systems are obtained by table look-up, the DC bus power under the different bus voltage setting values may be calculated through the foregoing Formula (1). Combined with Formula (2), the DC bus power is known, the AC-side power of the DC-AC module is the output power demand value of the DC-AC module, and the maximum conversion efficiencies of the DC-AC module under the different bus voltage setting values are calculated in the foregoing embodiments, so the remaining powers of the DC bus under different DC bus setting values can be calculated. The remaining powers are input powers at the first terminal of the DC-DC module, that is, $P_{Bat}/\alpha_{DC\text{-}Bat}$ in Formula (2).

Based on the above calculation results, on the basis of obtaining the input power at the first terminal of the DC-DC module under the different bus voltage setting values, the maximum conversion efficiencies corresponding to the DC-DC module under the different bus voltage setting values may be obtained by table look-up. The table look-up involves an efficiency table of the DC-DC module, which is also similar to the efficiency table involved in the DC-AC module, and is related to characteristics of the device. The obtaining of the table may be obtained with reference to the foregoing description. Details are not repeated herein. On the basis of obtaining the maximum conversion efficiencies of the DC-DC module under different conditions, an optimal solution for the second terminal of the DC-DC module to provide the charging voltage to the energy storage module under these conditions can be calculated, namely, DC voltages under different conditions.

In the embodiment of the present application, a manner of obtaining the charging voltages of the energy storage module under the different bus voltage setting values when the DC-DC module reaches the maximum conversion efficiencies is given, which resolves an optimal solution to the output voltages of the DC-DC module under the different bus voltage setting values and provides data reference for subsequent system-based scheduling control.

In still another embodiment of the optical storage DC coupling control method proposed based on the above embodiment, the determining, according to the different bus voltage setting values and the AC voltages and the DC voltages under the different bus voltage setting values, a target bus voltage value, a target AC voltage value, and a target DC voltage value when the energy storage module reaches maximum charging power may include:

calculating, according to the output power demand value, the actual output power, the different bus voltage setting values, and the AC voltages and the DC voltages under the different bus voltage setting values, charging powers of the energy storage module under the different bus voltage setting values, to obtain a plurality of candidate charging powers;

selecting maximum candidate charging power from the plurality of candidate charging powers; and acquiring a bus voltage setting value, an AC voltage, and a DC voltage when the maximum candidate charging power is reached, the bus voltage setting value, the AC voltage, and the DC voltage when the maximum candidate charging power is reached corresponding to the target bus voltage value, the target AC voltage value, and the target DC voltage value.

The remaining powers of the DC bus may be calculated according to the execution manner in the foregoing embodiments through the output power demand value, the actual output power of the photovoltaic system, the different bus voltage setting values, and AC voltages under the different bus voltage setting values, and then the charging powers finally outputted by the DC-DC module to the energy storage module are obtained according to the remaining powers of the DC bus and the maximum conversion efficiencies of the DC-DC module when the DC voltages under the different bus voltage setting values are acquired and according to Formula (2).

It is to be noted that this embodiment gives an implementation method of obtaining the maximum charging power and the corresponding target bus voltage value, target AC voltage value, and target DC voltage value, with a core idea of obtaining, through a plurality of different bus voltage setting values preset by the control module, DC voltages and AC voltages under the different bus voltage setting values and target charging power by traversal calculation, then finding various parameters when the target charging power is maximum from existing traversal results, and controlling the parameters correspondingly as parameters of various modules in the optical storage DC coupling system.

In the embodiment of the present application, the plurality of candidate charging powers are obtained by traversal calculation, and the maximum charging power is selected therefrom. The operations are simple and convenient, and a selection scheme of an optimal solution with finite parameters is given, which helps to realize the control over an optimal scheduling scheme of the optical storage DC coupling system, and can meet the energy storage demand of the energy storage module to the greatest extent.

A further embodiment of the optical storage DC coupling control method is proposed based on the above embodiment. In this embodiment, the determining, according to the different bus voltage setting values and the AC voltages and the DC voltages under the different bus voltage setting values, a target bus voltage value, a target AC voltage value, and a target DC voltage value when the energy storage module reaches maximum charging power may include:

calculating, according to the output power demand value, the actual output power, the different bus voltage setting values, and the AC voltages and the DC voltages under the different bus voltage setting values, charging powers of the energy storage module under the different bus voltage setting values;

processing the different bus voltage setting values, and the AC voltages, the DC voltages, and the charging powers under the different bus voltage setting values to obtain a fitting relationship between the bus voltage setting values, the AC voltages, the DC voltages, and the charging powers; and calculating, according to the fitting relationship, the target bus voltage value, the target AC voltage value, and the target DC voltage value at the maximum charging power.

The method for calculating the charging powers of the energy storage module under the different bus voltage setting values is consistent with the method involved in FIG. 6. Details are not repeated herein.

It is to be noted that this embodiment gives an implementation method of obtaining the maximum charging power and the corresponding target bus voltage value, target AC voltage value, and target DC voltage value, with a core idea of calculating, through a plurality of different bus voltage setting values preset by the control module, DC voltages and AC voltages under the different bus voltage setting values and target charging power, and then fitting a relationship between the charging powers of the energy storage module, the DC voltages, the AC voltages, and the bus voltage setting values, so as to obtain the fitting relationship. The fitting relationship may be a fitting equation or a fitting curve. Finally, a DC voltage, an AC voltage, and a bus voltage setting value under the maximum charging power may be calculated according to the fitting relationship, correspondingly taken as the target DC voltage value, the target AC voltage value, and the target bus voltage value.

In the embodiment of the present application, a relationship between various parameters is fitted, so that the maximum charging power of the energy storage module with reasonable conversion efficiency of each device module of the optical-storage DC coupling system, and output voltage parameters of the DC-DC module, the DC-AC module, and the plurality of photovoltaic systems when the maximum charging power is reached can be obtained according to the fitting relationship. Thus the energy storage demand of the energy storage module can be met to the greatest extent.

It is to be further noted that, in other optional examples, an optimal solution to the output voltage of each device that maximizes the charging power of the energy storage module based on the consideration of the entire optical storage DC coupling system may be found with a method such as gradient descent according to different bus voltage setting values and the AC voltages, the DC voltages, and the charging powers under the different bus voltage setting values, so as to charge the energy storage module as much as possible.

FIG. 6 is a schematic diagram of a hardware structure of an energy management apparatus according to an embodiment of the present application. The energy management apparatus may include a processor 601 and a memory 602 storing computer program instructions.

Specifically, the above processor 601 may include a central processing unit (CPU), or an Application Specific Integrated Circuit (ASIC), or may be configured to implement one or more integrated circuits in the embodiments of the present application.

The memory 602 may include a mass memory for data or instructions. As an example and not by way of limitation, the memory 602 may include a Hard Disk Drive (HDD), a floppy disk drive, a flash memory, an optical disc, a magneto-optical disc, a magnetic tape, or a Universal Serial Bus (USB) drive or a combination of two or more thereof. The memory 602 may include removable or non-removable (or fixed) media, where appropriate. The memory 602 may be inside or outside an integrated gateway disaster recovery device, where appropriate. In a particular embodiment, the memory 602 may be a non-volatile solid-state memory.

In a particular embodiment, the memory may include a read-only memory (ROM), a random access memory (RAM), a magnetic disk storage medium device, an optical storage media device, a flash memory device, an electrical, optical, or another physical/tangible memory storage device. Therefore, generally, the memory includes one or more tangible (non-transitory) computer-readable storage media (e.g., a memory device) encoded with software including computer-executable instructions and when the software is executed (e.g., by the one or more processors), it is operable to perform the operations described with reference to the method according to an aspect of the present disclosure.

The processor 601 reads and executes the computer program instructions stored in the memory 602 to implement any one of the optical storage DC coupling control methods in the above embodiments.

In an example, the energy management apparatus may further include a communication interface 603 and a bus 66. As shown in FIG. 6, the processor 601, the memory 602, and the communication interface 603 are connected through the bus 66 and complete mutual communication.

The communication interface 603 is mainly configured to implement communication between the various modules, apparatuses, units and/or devices in the embodiments of the present application.

The bus 66 includes hardware, software, or both, and couples components of an image processing device to each other. By way of example and not limitation, the bus may include an accelerated graphics port (AGP) or other graphics buses, an enhanced industry standard architecture (EISA) bus, a front side bus (FSB), a hypertransport (HT) interconnect bus, an industry standard architecture (ISA) bus, an infinite bandwidth Interconnect, a low pin count (LPC) bus, a memory bus, a micro channel architecture (MCA) bus, a peripheral component interconnect (PCI) bus, a PCI-Express (PCI-X) bus, a serial advanced technology attachment (SATA) bus, a video electronics standards association local (VLB) bus, other suitable buses, or a combination of two or more of the foregoing. The bus 66 may include one or more buses, where appropriate. Although a specific bus is described and shown in the embodiments of the present application, any suitable bus or interconnection is considered in the present application.

The energy management apparatus may perform the optical storage DC coupling control method in the embodiments of the present application, so as to implement the optical storage DC coupling control circuit and method described with reference to the above embodiments.

In addition, in combination with the optical storage DC coupling control method in the foregoing embodiments, the embodiments of the present application may provide a computer storage medium for implementation. The computer storage medium stores computer program instructions, and when the computer program instructions are executed by the processor, any one of the optical storage DC coupling control methods in the foregoing embodiments is implemented.

In addition, the embodiments of the present application further provide a computer program product, including a computer program. When the computer program is executed by a processor, steps and corresponding content in the foregoing method embodiments may be implemented.

Although the present application has already been described with reference to some embodiments, various improvements may be made to the present application and the components therein may be replaced with equivalents without departing from the scope of the present application. In particular, as long as there is no structural conflict or control manner conflict, various technical features mentioned in the various embodiments may be combined in any manner. The present application is not limited to the specific embodiments disclosed herein, and includes all technical solutions falling within the scope of the claims.

What is claimed is:

1. An optical storage direct current (DC) coupling control circuit, comprising:
   a Direct Current-Alternating Current (DC-AC) module, a DC side of the DC-AC module being connected to a plurality of photovoltaic systems via a DC bus, and an AC side of the DC-AC module being connected to a power grid;
   a Direct Current-Direct Current (DC-DC) module, a first terminal of the DC-DC module being configured to connect the DC bus, and a second terminal of the DC-DC module being connected to an energy storage module; and
   a control module connected to the DC-AC module, the DC-DC module, and the plurality of photovoltaic systems and configured to:
      acquire an actual output power of the photovoltaic systems and an output power demand value of the DC-AC module, and calculate, according to the actual output power and the output power demand value, AC voltages and DC voltages when output power of the DC-AC module reaches the output power demand value under a plurality of different bus voltage setting values, the AC voltages being AC-side output voltages when the DC-AC module reaches maximum conversion efficiency, and the DC voltages being charging voltages of the energy storage module when the DC-DC module reaches maximum conversion efficiency; and
      determine, according to the different bus voltage setting values and the AC voltages and the DC voltages under the different bus voltage setting values, a target bus voltage value, a target AC voltage value, and a target DC voltage value when the energy storage module reaches maximum charging power, and control the plurality of photovoltaic systems, the DC-AC module, and the DC-DC module to perform output correspondingly according to the target bus voltage value, the target AC voltage value, and the target DC voltage value.

2. The optical storage DC coupling control circuit according to claim 1, wherein the control module is configured to:
   calculate, according to the output power demand value, the actual output power, the different bus voltage setting values, and the AC voltages and the DC voltages under the different bus voltage setting values, charging powers of the energy storage module under the different bus voltage setting values, to obtain a plurality of candidate charging powers; and
   select maximum candidate charging power from the plurality of candidate charging powers, and acquire a bus voltage setting value, an AC voltage, and a DC voltage when the maximum candidate charging power is reached, the bus voltage setting value, the AC voltage, and the DC voltage when the maximum candidate charging power is reached corresponding to the target bus voltage value, the target AC voltage value, and the target DC voltage value.

3. The optical storage DC coupling control circuit according to claim 1, wherein the control module is further configured to:
calculate, according to the output power demand value, the actual output power, the different bus voltage setting values, and the AC voltages and the DC voltages under the different bus voltage setting values, charging powers of the energy storage module under the different bus voltage setting values; and
process the different bus voltage setting values, and the AC voltages, the DC voltages, and the charging powers under the different bus voltage setting values to obtain a fitting relationship between the bus voltage setting values, the AC voltages, the DC voltages, and the charging powers, so as to calculate, according to the fitting relationship, the target bus voltage value, the target AC voltage value, and the target DC voltage value at the maximum charging power.

4. The optical storage DC coupling control circuit according to claim 1, wherein the control module is further configured to:
acquire, according to the output power demand value and the plurality of different bus voltage setting values, maximum conversion efficiencies respectively corresponding to the DC-AC module when the output power of the DC-AC module reaches the output power demand value under the different bus voltage setting values; and
calculate the AC voltages under the different bus voltage setting values, the AC voltages being AC-side voltages when the DC-AC module reaches the maximum conversion efficiencies.

5. The optical storage DC coupling control circuit according to claim 4, wherein the control module is further configured to:
acquire maximum conversion efficiencies of the photovoltaic systems under the different bus voltage setting values according to the actual output power of the photovoltaic systems and the plurality of different bus voltage setting values;
calculate remaining powers of the DC bus under the different bus voltage setting values according to the actual output power of the photovoltaic systems, the maximum conversion efficiencies of the photovoltaic systems, the maximum conversion efficiencies respectively corresponding to the DC-AC module, and the AC voltages under the different bus voltage setting values;
acquire maximum conversion efficiencies of the DC-DC module under the different bus voltage setting values according to the different bus voltage setting values and the remaining powers of the DC bus under the different bus voltage setting values; and
calculate the DC voltages under the different bus voltage setting values, the DC voltages being the charging voltages of the energy storage module when the DC-DC module reaches the maximum conversion efficiencies.

6. The optical storage DC coupling control circuit according to claim 1, further comprising:
a collection module;
wherein:
the collection module is connected to the control module and configured to collect and send current values and voltage values of the photovoltaic systems; and
the control module is further configured to calculate the actual output power of the photovoltaic systems according to the current values and the voltage values of the photovoltaic systems.

7. An optical storage direct current (DC) coupling control method, applied to an optical storage DC coupling control system, the optical storage DC coupling control system being connected to a Direct Current-Alternating Current (DC-AC) module, a Direct Current-Direct Current (DC-DC) module, and a plurality of photovoltaic systems, the method comprising:
acquiring actual output power of the photovoltaic systems and an output power demand value of the DC-AC module;
calculating, according to the actual output power and the output power demand value, AC voltages and DC voltages when output power of the DC-AC module reaches the output power demand value under a plurality of different bus voltage setting values, the AC voltages being AC-side output voltages when the DC-AC module reaches maximum conversion efficiency, and the DC voltages being charging voltages of an energy storage module connected to the DC-DC module when the DC-DC module reaches maximum conversion efficiency;
determining, according to the different bus voltage setting values and the AC voltages and the DC voltages under the different bus voltage setting values, a target bus voltage value, a target AC voltage value, and a target DC voltage value when the energy storage module reaches maximum charging power; and
controlling the plurality of photovoltaic systems, the DC-AC module, and the DC-DC module to perform output correspondingly according to the target bus voltage value, the target AC voltage value, and the target DC voltage value.

8. The optical storage DC coupling control method according to claim 7, wherein determining, according to the different bus voltage setting values and the AC voltages and the DC voltages under the different bus voltage setting values, the target bus voltage value, the target AC voltage value, and the target DC voltage value when the energy storage module reaches maximum charging power comprises:
calculating, according to the output power demand value, the actual output power, the different bus voltage setting values, and the AC voltages and the DC voltages under the different bus voltage setting values, charging powers of the energy storage module under the different bus voltage setting values, to obtain a plurality of candidate charging powers;
selecting maximum candidate charging power from the plurality of candidate charging powers; and
acquiring a bus voltage setting value, an AC voltage, and a DC voltage when the maximum candidate charging power is reached, the bus voltage setting value, the AC voltage, and the DC voltage when the maximum candidate charging power is reached corresponding to the target bus voltage value, the target AC voltage value, and the target DC voltage value.

9. The optical storage DC coupling control method according to claim 7, wherein determining, according to the different bus voltage setting values and the AC voltages and the DC voltages under the different bus voltage setting values, the target bus voltage value, the target AC voltage value, and the target DC voltage value when the energy storage module reaches maximum charging power comprises:

calculating, according to the output power demand value, the actual output power, the different bus voltage setting values, and the AC voltages and the DC voltages under the different bus voltage setting values, charging powers of the energy storage module under the different bus voltage setting values;

processing the different bus voltage setting values, and the AC voltages, the DC voltages, and the charging powers under the different bus voltage setting values to obtain a fitting relationship between the bus voltage setting values, the AC voltages, the DC voltages, and the charging powers; and calculating, according to the fitting relationship, the target bus voltage value, the target AC voltage value, and the target DC voltage value at the maximum charging power.

10. The optical storage DC coupling control method according to claim 7, wherein calculating, according to the actual output power and the output power demand value, the AC voltages when output power of the DC-AC module reaches the output power demand value under the plurality of different bus voltage setting values comprises:

acquiring, according to the output power demand value and the plurality of different bus voltage setting values, maximum conversion efficiencies respectively corresponding to the DC-AC module when the output power of the DC-AC module reaches the output power demand value under the different bus voltage setting values; and calculating the AC voltages under the different bus voltage setting values, the AC voltages being AC-side voltages when the DC-AC module reaches the maximum conversion efficiencies.

11. The optical storage DC coupling control method according to claim 10, wherein calculating, according to the actual output power and the output power demand value, the DC voltages under the plurality of different bus voltage setting values comprises:

acquiring maximum conversion efficiencies of the photovoltaic systems under the different bus voltage setting values according to the actual output power of the photovoltaic systems and the plurality of different bus voltage setting values;

calculating remaining powers of the DC bus under the different bus voltage setting values according to the actual output power of the photovoltaic systems, the maximum conversion efficiencies of the photovoltaic systems, the maximum conversion efficiencies respectively corresponding to the DC-AC module, and the AC voltages under the different bus voltage setting values;

acquiring maximum conversion efficiencies of the DC-DC module under the different bus voltage setting values according to the different bus voltage setting values and the remaining powers of the DC bus under the different bus voltage setting values; and calculating DC voltages under the different bus voltage setting values, the DC voltages being the charging voltages of the energy storage module when the DC-DC module reaches the maximum conversion efficiencies.

12. The optical storage DC coupling control method according to claim 7, wherein the optical storage DC coupling control system is further connected to a collection module;

the method further comprising:

receiving current values and voltage values of the photovoltaic systems collected by the collection module; and calculating the actual output power of the photovoltaic systems according to the current values and the voltage values of the photovoltaic systems.

13. An optical storage direct current (DC) coupling control system, comprising:

a processor; and a memory storing programs or instructions that, when executed by the processor, cause the processor to:

acquire actual output power of a plurality of photovoltaic systems connected to the optical storage DC coupling control system and an output power demand value of a Direct Current-Alternating Current (DC-AC) module coupled to the optical storage DC coupling control system;

calculate, according to the actual output power and the output power demand value, AC voltages and DC voltages when output power of the DC-AC module reaches the output power demand value under a plurality of different bus voltage setting values, the AC voltages being AC-side output voltages when the DC-AC module reaches maximum conversion efficiency, and the DC voltages being charging voltages of an energy storage module connected to a Direct Current-Direct Current (DC-DC) module when the DC-DC module reaches maximum conversion efficiency, the DC-DC module being connected to the optical storage DC coupling control system;

determine according to the different bus voltage setting values and the AC voltages and the DC voltages under the different bus voltage setting values, a target bus voltage value, a target AC voltage value, and a target DC voltage value when the energy storage module reaches maximum charging power; and control the plurality of photovoltaic systems, the DC-AC module, and the DC-DC module to perform output correspondingly according to the target bus voltage value, the target AC voltage value, and the target DC voltage value.

14. The optical storage DC coupling control system according to claim 13, wherein the programs or instructions, when executed by the processor, further cause the processor to:

calculate, according to the output power demand value, the actual output power, the different bus voltage setting values, and the AC voltages and the DC voltages under the different bus voltage setting values, charging powers of the energy storage module under the different bus voltage setting values, to obtain a plurality of candidate charging powers;

select maximum candidate charging power from the plurality of candidate charging powers; and acquire a bus voltage setting value, an AC voltage, and a DC voltage when the maximum candidate charging power is reached, the bus voltage setting value, the AC voltage, and the DC voltage when the maximum candidate charging power is reached corresponding to the target bus voltage value, the target AC voltage value, and the target DC voltage value.

15. The optical storage DC coupling control system according to claim 13, wherein the programs or instructions, when executed by the processor, further cause the processor to:

calculate, according to the output power demand value, the actual output power, the different bus voltage setting values, and the AC voltages and the DC voltages under the different bus voltage setting values, charging powers of the energy storage module under the different bus voltage setting values;

process the different bus voltage setting values, and the AC voltages, the DC voltages, and the charging powers under the different bus voltage setting values to obtain a fitting relationship between the bus voltage setting values, the AC voltages, the DC voltages, and the charging powers; and calculate, according to the fitting relationship, the target bus voltage value, the target AC voltage value, and the target DC voltage value at the maximum charging power.

16. The optical storage DC coupling control system according to claim 13, wherein the programs or instructions, when executed by the processor, further cause the processor to:

acquire, according to the output power demand value and the plurality of different bus voltage setting values, maximum conversion efficiencies respectively corresponding to the DC-AC module when the output power of the DC-AC module reaches the output power demand value under the different bus voltage setting values; and calculate the AC voltages under the different bus voltage setting values, the AC voltages being AC-side voltages when the DC-AC module reaches the maximum conversion efficiencies.

17. The optical storage DC coupling control system according to claim 16, wherein the programs or instructions, when executed by the processor, further cause the processor to:

acquire maximum conversion efficiencies of the photovoltaic systems under the different bus voltage setting values according to the actual output power of the photovoltaic systems and the plurality of different bus voltage setting values;

calculate remaining powers of the DC bus under the different bus voltage setting values according to the actual output power of the photovoltaic systems, the maximum conversion efficiencies of the photovoltaic systems, the maximum conversion efficiencies respectively corresponding to the DC-AC module, and the AC voltages under the different bus voltage setting values;

acquire maximum conversion efficiencies of the DC-DC module under the different bus voltage setting values according to the different bus voltage setting values and the remaining powers of the DC bus under the different bus voltage setting values; and calculate DC voltages under the different bus voltage setting values, the DC voltages being the charging voltages of the energy storage module when the DC-DC module reaches the maximum conversion efficiencies.

18. The optical storage DC coupling control system according to claim 13, wherein:

the optical storage DC coupling control system is further connected to a collection module; and the programs or instructions, when executed by the processor, further cause the processor to:

receive current values and voltage values of the photovoltaic systems collected by the collection module; and calculate the actual output power of the photovoltaic systems according to the current values and the voltage values of the photovoltaic systems.

* * * * *